Figure 1:
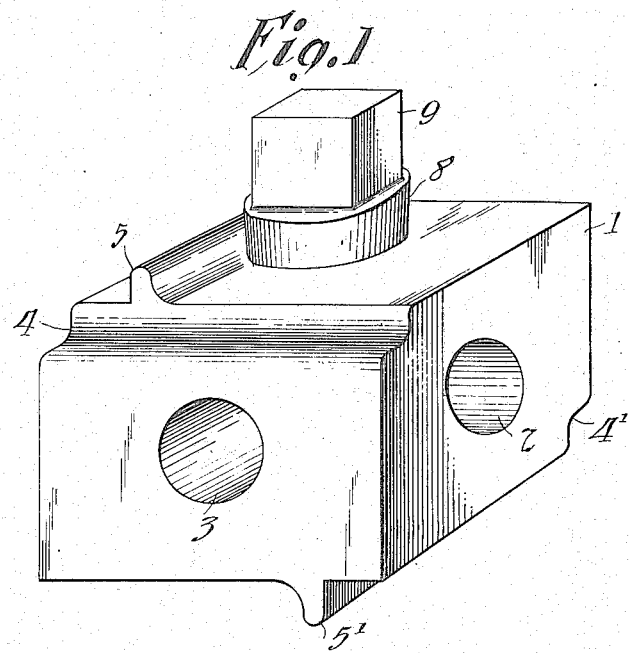

J. V. MILLER.
THREE-WAY COCK.
APPLICATION FILED MAR. 2, 1911.

1,129,889.

Patented Mar. 2, 1915.
2 SHEETS—SHEET 1.

Witnesses:

Inventor:
John V. Miller
by Frank L. Dyer
his Atty.

J. V. MILLER.
THREE-WAY COCK.
APPLICATION FILED MAR. 2, 1911.

1,129,889.

Patented Mar. 2, 1915.
2 SHEETS—SHEET 2.

UNITED STATES PATENT OFFICE.

JOHN V. MILLER, OF EAST ORANGE, NEW JERSEY.

THREE-WAY COCK.

1,129,889.  Specification of Letters Patent.  Patented Mar. 2, 1915.

Application filed March 2, 1911. Serial No. 611,823.

*To all whom it may concern:*

Be it known that I, JOHN V. MILLER, a citizen of the United States, and a resident of East Orange, in the county of Essex and State of New Jersey, have invented a certain new and useful Three-Way Cock, of which the following is a description.

My invention relates to pipe connections and more specifically to a three-way cock primarily designed for use in pipe systems in which acids or other chemicals are carried.

My object is to provide a novel and efficient device of this character not acted upon by chemicals or other fluids passing therethrough; and with this object in view, my invention contemplates the use for all parts with which such fluids are brought into contact of a material which is not affected thereby. As illustrative of my invention I have shown a three-way cock having a body and a valve therefor made of porcelain or earthenware, the remaining parts of the said device being so located as not to be contacted by the fluids.

Another object of my invention is to provide a strong and efficient pipe connection wherein a body is provided with means to prevent lateral shifting of the members for fastening the pipes in place, thereby insuring a proper registration of the said pipes and the passages in the body. It has heretofore been common to provide devices of this character with openings extending through the body for holding the fastening members in place, but these devices have been found difficult to make and liable to break when the fastening members for the pipes were drawn tight. These objections I avoid by forming the holding means for the fastening members exteriorly of the body.

Other objects of my invention will appear more fully in the following specification and appended claims.

Figure 2:
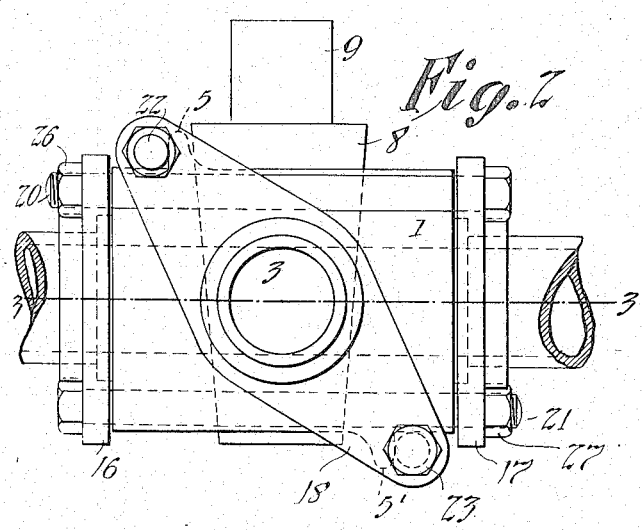
Figure 3:
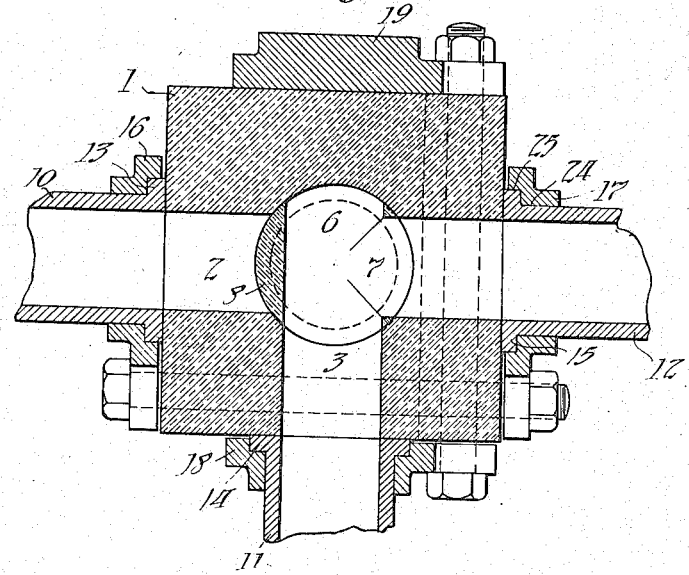
Figure 4:
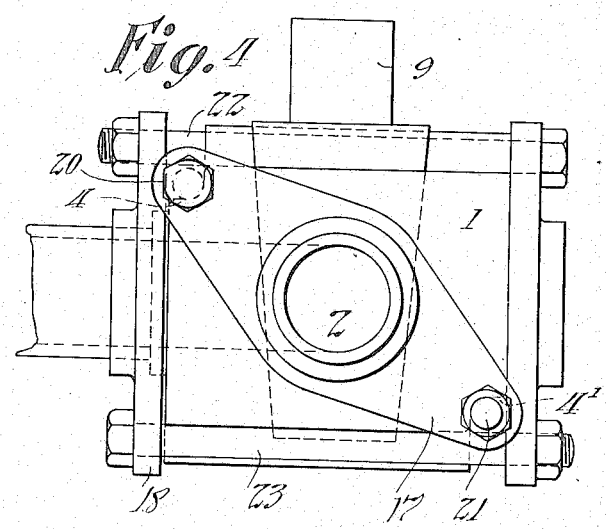

In order that my invention may be more fully understood, attention is hereby directed to the accompanying drawings forming a part of this specification and in which—
Figure 1 is a perspective view of the body forming a part of my improved device; Fig. 2 is a front view of the complete device; Fig. 3 is a horizontal section taken on line 3—3 of Fig. 2; and Fig. 4 is a side elevation of the device shown in Figs. 2 and 3.

In all the views like parts are designated by the same reference numerals.

Referring to the drawings, 1 designates a porcelain or earthenware body having the main passage 2 extending therethrough and a by-pass 3 leading from said main passage to the exterior of the body and extending at right angles to the main passage. Along the diagonally opposite edges of the upper and lower surfaces of the body are two parallel grooves or recesses 4 and 4' respectively, and projecting from the same surfaces are two parallel ribs or projections 5 and 5' respectively. As shown in the drawings, the grooves 4 and 4' are placed parallel to the main passage 2 and the projections 5 and 5' parallel to the by-pass 3; but it is obvious that the directions of the grooves and projections may be interchanged or otherwise altered.

Rotatably mounted in the body 1 and having transverse openings 6 and 7 at right angles to each other for regulating the flow through the main passage 2 and the by-pass 3 is a porcelain or earthenware valve 8 having a square upper portion 9 for engagement with any desired turning means.

As shown in Fig. 3 the pipes 10, 11 and 12 which are preferably made of lead or some other material not acted upon by chemicals, are provided with integral outwardly extended flanges 13, 14 and 15 respectively. These pipes are secured to the member 1 by metallic flanges 16, 17, 18, 19 and fastening members, preferably bolts, 20, 21, 22 and 23, each of the flanges 16, 17 and 18 being provided with a central aperture and an enlargement at the base of the said aperture to receive a pipe and the flange thereof respectively. The aperture and enlargement of the flange 17 are shown at 24 and 25 respectively in Fig. 3. In order that the ends of the pipes may be held firmly in engagement with the body, the pipe flanges are made of a sufficient thickness to extend slightly beyond the inner surfaces of the securing flanges.

In assembling my improved device, the shanks of the bolts 20 and 21 which secure the flanges 16 and 17 in position are placed in the grooves 4 and 4'; and, as the nuts 26 and 27 on these bolts are drawn tight to clamp the flanges in position with the pipes in register with the main passage, these bolts are held from displacement laterally by the walls of the said grooves. To hold the bolts 22 and 23 for the flanges 18 and 19 in place, while these bolts are being drawn tight, the latter are placed in engagement with the outer sides of the projections 5 and 5' respectively as is clearly shown in Fig. 2.

It is evident from the above description that the pipes, 10, 11 and 12 are held in intimate contact with the member 1 and that in no part of my coupling is the chemical permitted to contact any parts that might be affected thereby. It is also evident that by reason of the location of the fastening bolts for the flanges, exteriorly of the earthenware body member 1, the latter is permitted to retain approximately its full strength.

Having now described my invention what I claim and desire to protect by Letters Patent of the United States is as follows:

1. As an article of manufacture, a three-way cock comprising a body having a main passage therethrough and a by-pass leading from said main passage to the exterior of said body, said body having exteriorly thereof a plurality of parallel grooves, a valve mounted in said body and controlling the flow through said main passage and said by-pass, and means including a plurality of fastening members, for securing a plurality of pipes in register with the ends of said main passage and the outer end of said by-pass respectively, some of said fastening members being located in said grooves and the others on the upper and lower surfaces of said body, substantially as described.

2. As an article of manufacture, a three-way cock comprising a body of a material unaffected by chemicals, said body having a main passage therethrough and a by-pass leading from said main passage to the exterior of said body and having exteriorly thereof a plurality of parallel grooves, a valve also of a material unaffected by chemicals mounted in said body and controlling the flow through said main passage and said by-pass and means including a plurality of fastening members for securing a plurality of pipes in register with the ends of said main passage and said by-pass respectively, some of said fastening members being located in said grooves and the others on the upper and lower surfaces respectively of said body, substantially as described.

3. As an article of manufacture, a three-way cock comprising a body having a main passage therethrough and a by-pass leading from said main passage to the exterior of said body, the latter having exteriorly thereof a plurality of parallel grooves and a plurality of parallel projections at an angle to said grooves, a valve mounted in said body and controlling the flow through said main passage and said by-pass, and means including a plurality of fastening members for securing a plurality of pipes in register with the ends of said main passage and the outer end of said by-pass respectively, some of said fastening members being located in said grooves and the remainder being located on said body in engagement with said projections, substantially as described.

4. As an article of manufacture, a three-way cock comprising a body of a material unaffected by chemicals, said body having a main passage therethrough and a by-pass leading from said main passage to the exterior of said body, the latter having exteriorly thereof a plurality of parallel grooves and a plurality of parallel projections at an angle to said grooves, a valve mounted in said body member and controlling the flow through said main passage and said by-pass, and means including a plurality of bolts for securing a plurality of pipes in register with the ends of said main passage and the outer end of said by-pass respectively, some of said bolts being located in said grooves and the remainder on said body in engagement with said projections, substantially as described.

5. As an article of manufacture, a three-way cock comprising an earthenware body having a main passage therethrough and a by-pass leading from said main passage to the exterior of said body and having exteriorly thereof a plurality of parallel groves and a plurality of projections at an angle to said grooves, an earthenware valve mounted in said body and controlling the flow through said main passage and said by-pass, metallic flanges adapted to secure a plurality of pipes in intimate contact with said body and in register with the ends of said main passage and the outer end of said by-pass respectively, and a plurality of bolts for securing said flanges in position, two of said bolts being located in the grooves in the body and the other bolts on said body and in engagement with said projections, substantially as described.

6. As an article of manufacture, the combination of a body having a main passage therethrough and a by-pass leading from said main passage to the exterior of said body, said body having exteriorly thereof a plurality of parallel grooves, and means including a plurality of fastening members extending across said body for securing a plurality of pipes in register with the ends of said main passage and the outer end of said by-pass respectively, some of said fastening members being located in said grooves and the others on the upper and lower surfaces of said body and at an angle to the rest of said fastening members, substantially as described.

7. As an article of manufacture, the combination of a body having a main passage therethrough and a by-pass leading from said main passage to the exterior of said body, the latter having exteriorly thereof a plurality of parallel grooves and a plurality of parallel projections at an angle to said grooves, and means including a plurality of fastening members for securing a plurality of pipes in register with the ends of said main passage and the outer end of said by-pass respectively, some of said fastening members being located in said grooves and the remainder being located on said body in engagement with said projections, substantially as described.

8. As an article of manufacture, the combination of a body having a main passage therethrough and a by-pass leading from said main passage to the exterior of said body, and means including a plurality of fastening members located exteriorly of said body for securing a plurality of pipes in register with the ends of said main passage and the outer end of said by-pass respectively, the fastening members for the pipes secured in register with the ends of the main passage being substantially parallel to said passage and the fastening members for the other pipe being substantially parallel to said by-pass, substantially as described.

9. As an article of manufacture, the combination of a body having two passages therein disposed at an angle to each other, and means including a plurality of fastening members located exteriorly of said body for respectively securing pipes in register with the ends of said passages which terminate in the exterior of said body, the fastening members for securing the respective pipes to the said ends of said passages extending across said body substantially parallel to the respective passages, substantially as described.

This specification signed and witnessed this 28th day of February 1911.

JOHN V. MILLER.

Witnesses:
FREDERICK BACHMANN,
ANNA R. KLEHM.